United States Patent [19]
Unick et al.

[11] 3,899,433
[45] *Aug. 12, 1975

[54] METHOD OF METALWORKING UTILIZING A PARTICULAR LUBRICANT COMPOSITION

[75] Inventors: Alvin J. Unick, Baton Rouge, La.; Kenneth W. Gault, Newnan, Ga.

[73] Assignee: Ethyl Corporation, Richmond, Va.

[ * ] Notice: The portion of the term of this patent subsequent to July 11, 1989, has been disclaimed.

[22] Filed: Feb. 16, 1973

[21] Appl. No.: 332,997

Related U.S. Application Data

[62] Division of Ser. No. 267,384, June 29, 1972, abandoned, which is a division of Ser. No. 828,384, May 27, 1969, Pat. No. 3,676,348.

[52] U.S. Cl. .................. 252/52 R; 252/12; 252/54; 252/58
[51] Int. Cl. ............................................. C10m 1/20
[58] Field of Search ................. 252/52, 54, 58, 12

[56] References Cited
UNITED STATES PATENTS

| | | | |
|---|---|---|---|
| 2,524,017 | 9/1950 | Hance et al. | 252/33.4 |
| 2,962,401 | 11/1960 | Guminski | 252/52 R X |
| 3,252,909 | 5/1966 | Jenks | 252/52 R X |
| 3,676,348 | 7/1972 | Unick et al. | 252/52 R |

*Primary Examiner*—Delbert E. Gantz
*Assistant Examiner*—Andrew H. Metz
*Attorney, Agent, or Firm*—Donald L. Johnson; John F. Sieberth; Shelton B. McAnelly

[57] ABSTRACT

Disclosed are improved lubricants particularly useful for forming metallic articles into desired sizes and shapes based upon operations enhanceable by lubricants. Typical specific working operations are cutting, sawing, grinding, shaping, planing, stamping, drawing, sanding, filing, milling, shearing, machining, and drilling. Preferred lubricant compositions are alkanol mixtures of predominantly normal alcohol and branched primary alcohol structures having predominantly from about 20 to about 34 carbon atoms per molecule, with or most preferably, without other alcohols containing secondary hydroxyl groups or unsaturation ranging from about 14 to about 50 carbon atoms per molecule. The preferred lubricant compositions are characterized by useful residual or film properties for protection of surfaces, particularly those freshly exposed through working when using the lubricants. Such properties are enhanced by the combination of polar and non-polar aspects of the preferred molecules.

21 Claims, No Drawings

METHOD OF METALWORKING UTILIZING A PARTICULAR LUBRICANT COMPOSITION

CROSS-REFERENCE TO RELATED APPLICATIONS

This application is a division of application Ser. No. 267,384, filed June 29, 1972 and now abandoned which in turn is a division of Application Ser. No. 828,384, filed May 27, 1969 now U.S. Pat. No. 3,676,348 dated 7/11/72.

BACKGROUND OF THE INVENTION

1. Field of the Invention

This invention relates to lubricated metal working operations and to compositions of matter having utility in such applications and in numerous other applications such as surface protection. In particular, the invention relates to lubricants which are suitable for use in preparing finished metal articles having a minimum of contamination by undesired residual lubricant materials but wherein compositions placed on or allowed to remain on articles have significant surface protection capabilities and other desired characteristics such as "static" or "electrical conductivity" properties.

2. Description of the Prior Art

Many different substances, even water, are useful to some extent as lubricants or coolants or particle removal media for working various materials such as metals, plastics and even certain types of wood. Waxes, tallow and other ester type materials of high molecular weight have been used for such purposes in the past. In this area, however, the factor of cost-effectiveness hasa been an important limitation, and, for the most part, it has been customary to use waste and by-product materials has as discard oils obtained from crankcases of internal combustion engines, inedible tallow of animal origin, and the like. In general, materials purified only to a limited extent such as slack wax and the like have been used where cost is an important consideration. Such prior materials, although generally suitable in many operations, are not outstanding either as lubricants or as heat removal materials and can provide a substantial limitation on the maximum rates at which working operations can be performed. In addition, the general lack of purity of the materials may provide a limitation upon the subsequent use of products, particularly where it is desired to use manufactured articles with minimum intervening cleaning or even without such cleaning. To typify this latter category of use without cleaning, frequently it is desired to avoid cleaning to completeness retaining on the finished articles a film of protective material to minimize subsequent surface degradation through oxidation, corrosion and the like. Thus, containers and the like, manufactured from uncleaned bulk rolled materials, typically aluminum, come to be used in contact with food for human consumption.

SUMMARY

It is accordingly an object of the present invention to provide compositions having useful properties for machining various materials, particularly non-ferrous metals such as aluminum and copper and their alloys.

Another object of the present invention is to provide improved lubricants for metal working operations wherein the principal effective components of the lubricants consist essentially of normal and branched saturated primary alcohols having even numbers of carbon atoms per molecule ranging from about 20 to about 34 carbon atoms per molecule.

Another object of the present invention is to provide lubricants based on normal and branched primary alcohols having from about 20 to about 34 carbon atoms per molecule in admixture with hydrocarbons having from about 10 to about 34 carbon atoms per molecule, the alcohol content ranging from about 1 percent to 100 percent of the total lubricant composition.

Another object of the present invention is to provide high purity lubricants that do not require complete removal from bulk materials or finished articles of the foregoing general nature even where the finished articles are intended for use in contact with foods.

Another object of the present invention is to provide a metal working lubricant wherein residual quantities of lubricant are permitted to remain on the surface of the product metallic articles to provide useful corrosion and oxidation resistant properties even when present in small quantities and wherein the residual materials are tenacious and, when present in residual quantities, are not toxic to humans or to domestic and farm animals.

Another object of the present invention is to provide efficient lubricants for use with power transmission equipment such as flat leather belts, V-belts and the like, particularly those wherein contact of the lubricant with rubber is necessary and where static problems are encountered.

Another object of the present invention is to provide improved lubricant and preservative materials for rubber articles such as tires, for magnetic tape of the plastic-backed variety as well as magnetic tape of a metallic nature and metallic tape of a non-magnetic nature of utility, particularly wherein the lubricant is desired to provide coincidental benefit of surface protection for the tape or rubber articles.

Another object of the present invention is to provide improved moisture resistant impregnant or coating compositions for cellulose and like materials especially in critical applications with regard to water pick-up such as computer program tapes.

Another object of the present invention is to provide a residual lubricant for phonograph records.

Other and further objects and features of the present invention will become apparent upon the careful review of the following discussion.

In accordance with the basic teachings of the present invention, new compositions of matter are disclosed having utility in various ways; typically as improved metal working lubricant materials and coating materials, even in thin films.

The compositions of the present invention consist essentially of mixtures of normal alcohols and branched chain primary alcohols wherein the alcohols are pure or are mixtures with regard to molecular weight and have from about 20 to about 34 carbon atoms per molecule. Such compositions are useful directly in many instances as by direct application in concentrated form; however, in other instances their usefulness can be extended with other alcohols and with diluents, such as paraffins, olefin/paraffin mixtures, aerosol propellants, with lubricating oil, with halo hydrocarbons or with aqueous media, particularly in conjunction with surface-active agents. Halo hydrocarbons include mono halo hydrocarbons, poly halo hydrocarbons with similar and different halogen constituency. Typical halo hydrocarbons are fluoro and chloro hydrocarbons such as perchloro ethylene, 1,1,1-trichloroethane and chlorinated mineral oils and chlorinated fatty oils such as esters and their constituents. An outstanding feature of the foregoing compositions is that when used in concentrated form, many possess convenient melting points of the order of 110°–125°F so that they may be handled, applied and used in solid form, providing numerous advantages with regard to storage, transportation and ease of application and use. On the other hand, many concentrates are liquid for convenience in handling in that form. In many instances, the solid form minimizes many problems connected with centrifugal forces. On the other hand, the melting point makes it practical to use only moderately raised temperatures to provide a liquid condition facilitating use in that form where such is desired.

In one aspect, preferred compositions include a substantial percentage of about 10 to about 50 percent by weight or higher, or non-normal alcohols including the previously mentioned branched primary alcohols such as those with lower alkyl side chains such as 2-methyl, 3-methyl, 2-ethyl, 2-butyl, 2-hexyl, 4-ethyl, 2,4-diethyl, and 3,5-dimethyl. In addition, the non-normals include diols, particularly 1,2-, 2,3-; 3,4-; 1,3- and 1,4-diols and others having a boiling point higher than about 210°C at 15 mm pressure. Included are secondary alcohols particularly those of the 2—OH, 4-OH and 2—OH, 3-, or 4-, or 5- alkyl forms. Because of analysis techniques, diols are usually included in secondary alcohols, typically up to about a 1:1 ratio with secondary mono alcohols. The amount of secondary alcohols ranges upward to about a 2:1 ratio with the branched primary alcohols. The alkyl in the various cases just exemplified are typically methyl, ethyl, propyl, butyl and the like up to about dodecyl. Compatible unsaturation up to about 5 percent is acceptable in the non-normal alcohols. Unsaturation in the diluent up to about 25 percent of the molecules thereof is typical.

In greater particularity the invention is directed to compositions of matter consisting essentially of Component A which is alkanol containing from about 20 to 34 carbon atoms per molecule, Component B which is non-normal alcohol containing from about 20 to about 34 carbon atoms per molecule, and having less than about 5 percent unsaturated molecules, Component C which is hydrocarbon preferably unsubstituted, preferably staight chain, preferably saturated, and preferably having from about 20 to about 34 carbon atoms per molecule, the amount of Component C being up to about 99 percent by weight, this material being diluent, the weight ratio of Component A to Component B ranging from about 10 to 1 to about 1 to 10.

In a limited aspect the invention is directed to compositions of the foregoing type wherein:

the amount of Component C is from about 30 to about 98 percent by weight and wherein the weight ratio of Component A to Component B is from about 2:1 to about 1:2.

In a limited aspect the invention is directed to compositions of the foregoing type wherein the amount of Component C is from about 85 to about 98 percent by weight.

In a limited aspect the invention is directed to compositions of the foregoing type wherein the amount of Component C is from about 25 percent to about 75 percent by weight.

In a limited aspect the invention is directed to compositions of the foregoing type wherein the amount of Component C is from about 30 percent to about 40 percent by weight.

In a limited aspect the invention is directed to compositions of the foregoing type wherein the weight ratio of Component A to Component B is from about 2:1 to about 1:1.

In a limited aspect diluents include compatible halo hydrocarbons.

In a limited aspect expression, Component B is predominantly branched primary and secondary alcohols in about a 1:2 ratio, the secondary alcohols including mono alcohols and diols in a ratio range from 1:0 to about 1:1.

In a limited aspect the invention is directed to compositions of the foregoing type wherein substantially all Component A, B and C molecules present contain an even number of carbon atoms per molecule.

In a limited aspect the invention is directed to compositions of the foregoing type wherein the overall percentage of molecules of straight chain carbon skeletal configuration is from about 50 to about 75 percent by weight, wherein substantially all molecules present contain an even number of carbon atoms and wherein the melting point is from about 110° to about 125°F.

Compositions of the foregoing types are produced by distilling, blending, etc. using pure individual components or mixtures containing several components.

Examples of preferred and typical compositions are set forth. The scope of the invention is defined in the claims and is not restricted to specific examples.

EXAMPLE 1

A mixture in accordance with the present invention was produced having the following compositions:

| | Alcohols | Non-Normal Alcohols | Paraffins* |
|---|---|---|---|
| $C_{18}$ | 1.11 | — | — |
| $C_{20}$ | 31.69 | — | 0.45 |
| $C_{22}$ | 28.02 | 0.20 | 1.21 |
| $C_{24}$ | 16.75 | 0.59 | 0.24 |
| $C_{26}$ | 8.75 | 0.63 | 0.62 |
| $C_{28}$ | 2.74 | 0.60 | 0.67 |
| $C_{30}$ | 0.36 | 1.44 | 0.76 |
| $C_{32}$ | — | 1.22 | 0.92 |
| $C_{34}$ | — | 0.28 | 0.53 |
| $C_{36}$ | — | — | 0.22 |
| | 89.42 | 4.95 | 5.63 |

*The paraffins include about 4 percent olefins. Iodine value about 2.0 centigrams/gram.

$$\text{Ratio } \frac{\text{normal alcohol}}{\text{non-normal alcohol}} = 18.1/1$$

$$\text{Ratio } \frac{\text{alcohol}}{\text{non alcohol}} = 94.4/5.6$$

The non-primary alcohols are about 2:1 branched primary and secondary, the structures being predominantly 2-ethyl, 2-butyl, and 4-OH. About 50 percent of sec-OH is mixed diols in predominantly 1,2- to 1,4- configurations.

This material is an excellent lubricant for working operations.

In typical usage it is formed into an elongated bar and intermittently placed in contact with a band saw blade when cutting aluminum castings of approximately 6 × 6 inch cross section. The ordinary build-up of aluminum on the saw blade does not occur and very smooth cutting is evidenced from the appearance of the cut ends of the casting.

Similar results are obtained in cutting copper busbars of approximately 1 × 2 inch cross section.

Similar results are obtained in cutting aluminum sheet in 1, ½, ¼, ⅛ and 1/16 inch thicknesses.

Similar results are obtained in cutting brass articles.

Similar results are obtained in working brass in die expansion and compression operations, die friction being less than with paraffin lubricants.

The compositions are tested in lubricated turning and drilling operations on ferrous metal rod and plate, respectively. The compositions were tested in concentrated form applied as a solid and in recirculated liquid coolant systems.

In recirculated liquid systems, the compositions rich in branched alcohols are preferred because of the somewhat lower melting point of the branched alcohols in comparison to the straight chain saturated primary alcohols.

Desirable lubricating and cooling characteristics are obtained.

The composition is tested in other uses set forth in the foregoing and found to have desirable properties as discussed. (All ratios in examples are by weight.)

EXAMPLE 2

A second mixture was produced having the following composition:

|         | Normal Alcohols | Non-Normal Alcohols | Paraffins |
|---------|-----------------|---------------------|-----------|
| $C_{18}$ | 0.18  | —    | —    |
| $C_{20}$ | 21.12 | 0.43 | —    |
| $C_{22}$ | 22.82 | 1.93 | —    |
| $C_{24}$ | 14.85 | 3.29 | 0.39 |
| $C_{26}$ | 8.08  | 3.62 | 1.49 |
| $C_{28}$ | 3.96  | 3.13 | 2.18 |
| $C_{30}$ | 1.49  | 2.01 | 2.04 |
| $C_{32}$ | 0.32  | 1.00 | 1.34 |
| $C_{34}$ | —     | 1.02 | 0.83 |
| $C_{36}$ | —     | 0.48 | 0.84 |
| $C_{38}$ | —     | —    | 0.67 |
| $C_{40}$ | —     | —    | 0.47 |
|         | 72.84 | 16.91 | 10.25 |

$$\text{Ratio } \frac{\text{normal alcohol}}{\text{non-normal alcohol}} = 4.3/1$$

$$\text{Ratio } \frac{\text{alcohol}}{\text{non alcohol}} = 89.75/10.25$$

The branched/secondary proportions are similar to those of Example 1. Iodine value is about 4.0.

The composition is tested as in Example 1, similar desirable results being obtained.

EXAMPLE 3

The following mixture was produced.

|         | Normal Alcohols | Non-Normal Alcohols | Paraffin* |
|---------|-----------------|---------------------|-----------|
| $C_{18}$ | 0.91  | —     | —    |
| $C_{20}$ | 21.50 | 4.69  | —    |
| $C_{22}$ | 6.52  | 10.94 | —    |
| $C_{24}$ | 2.40  | 12.30 | 2.16 |
| $C_{26}$ | 1.41  | 12.25 | 3.11 |
| $C_{28}$ | 0.46  | 8.75  | 3.02 |
| $C_{30}$ | —     | 3.16  | 2.60 |
| $C_{32}$ | —     | 1.00  | 1.33 |
| $C_{34}$ | —     | 0.17  | 1.10 |
| $C_{36}$ | —     | —     | 0.22 |
| $C_{38}$ | —     | —     | —    |
| $C_{40}$ | —     | —     | —    |
|         | 33.20 | 53.26 | 13.54 |

$$\text{Ratio } \frac{\text{normal alcohol}}{\text{non-normal alcohol}} = 0.62/1$$

$$\text{Ratio } \frac{\text{alcohol}}{\text{non alcohol}} = 86.46/13.54$$

The branched alcohol/secondary alcohol proportions are similar to those of Example 1. Iodine value is about 8.0.

The composition is tested as in Example 1, similar desirable results being obtained.

EXAMPLE 4

The following mixture was produced.

|         | Normal Alcohols | Non-Normal Alcohols | Paraffin* |
|---------|-----------------|---------------------|-----------|
| $C_{18}$ | 9.9  | —    | —   |
| $C_{20}$ | 69.6 | 10.0 | —   |
| $C_{22}$ | 2.5  | 4.5  | 0.1 |
| $C_{24}$ | —    | —    | 3.0 |
| $C_{26}$ | —    | —    | 0.4 |
|         | 82.0 | 14.5 | 3.5 |

$$\text{Ratio } \frac{\text{normal alcohol}}{\text{non-normal alcohol}} = 5.7/1$$

$$\text{Ratio } \frac{\text{alcohol}}{\text{non alcohol}} = 96.5/3.5$$

The branched alcohol/secondary alcohol proportions are similar to those of Example 1. Iodine value is about 0.5.

The composition is tested as in Example 1, similar desirable results being obtained.

EXAMPLES 5-11

Preceding examples are repeated wherein the alcohols are distributed according to the tabulation that follows.

The compositions are tested as in Example 1, similar desirable results are obtained.

Proportions not specified are similar to those of Example 1.

|  | Example 5 | | Example 6 | | Example 7 | | Example 8 | | Example 9 | | Example 10 | | Example 11 | |
|---|---|---|---|---|---|---|---|---|---|---|---|---|---|---|
|  | NOH | NNOH | NOH | NNOH | NOH | NNOH | NOH | NNOH | NOH | NNOH | NOH | NNOH | NOH | NNOH |
| $C_{18}$ | 0.21 | 0.06 | 0.30 | — | 0.65 | — | 1.45 | — | 0.73 | 0.65 | 0.27 | — | — | 0.95 |
| $C_{20}$ | 11.42 | 0.82 | 10.86 | 0.73 | 20.44 | 1.29 | 19.73 | 1.90 | 14.68 | 1.65 | 16.16 | 0.59 | 22.36 | 3.31 |
| $C_{22}$ | 7.92 | 3.69 | 7.75 | 3.66 | 11.38 | 3.17 | 10.14 | 3.76 | 9.36 | 4.57 | 9.73 | 4.64 | 6.94 | 3.63 |
| $C_{24}$ | 5.23 | 5.58 | 5.19 | 5.93 | 6.13 | 5.29 | 5.73 | 4.86 | 5.87 | 5.40 | 5.76 | 7.13 | 3.54 | 4.67 |
| $C_{26}$ | 3.40 | 6.81 | 3.67 | 8.13 | 3.25 | 6.66 | 3.13 | 6.18 | 2.90 | 6.45 | 3.35 | 7.59 | 1.64 | 6.75 |
| $C_{28}$ | 1.34 | 6.89 | 1.36 | 8.18 | 1.38 | 5.97 | 1.42 | 5.42 | 1.32 | 4.37 | — | 7.18 | — | 7.44 |
| $C_{30}$ | 0.74 | 6.08 | 0.85 | 7.47 | 0.56 | 3.65 | 0.48 | 3.67 | — | 4.50 | — | 5.56 | — | 1.73 |
| $C_{32}$ | — | 4.29 | — | 3.23 | — | 0.12 | 0.16 | 1.67 | — | 0.26 | — | 2.45 | — | — |
| $C_{34}$ | — | 2.89 | — | 1.59 | — | 0.79 | — | 1.05 | — | — | — | 0.41 | — | — |
| $C_{36}$ | — | 1.83 | — | 1.33 | — | 0.90 | — | 0.38 | — | — | — | — | — | — |
| $C_{38}$ | — | 1.05 | — | 0.50 | — | — | — | 0.23 | — | — | — | — | — | — |
| $C_{40}$ | — | 0.49 | — | 0.28 | — | — | — | 0.04 | — | — | — | — | — | — |
| $C_{42}$ | — | 0.48 | — | — | — | — | — | — | — | — | — | — | — | — |
| $C_{44}$ | — | — | — | — | — | — | — | — | — | — | — | — | — | — |
| Total | 30.26 | 40.96 | 29.98 | 41.03 | 43.79 | 27.84 | 42.24 | 29.16 | 34.86 | 27.85 | 35.27 | 35.55 | 34.48 | 28.48 |

NOH - Normal alcohol.
NNOH - Non-normal alcohol.

All numbers percent by weight, balance to 100 percent is paraffin/olefin in about 6:1 ratio.
Iodine value is about 5–10 cg/g.

The ratios of these examples are as follows:

| Examples | Normal Alcohols | Non-normal Alcohols | Ratio | Total Normal/ Total Non-normal |
|---|---|---|---|---|
| 5 | 30.26 | 40.96 | 0.74/1 | 71.22/28.78 |
| 6 | 29.98 | 41.03 | 0.73/1 | 71.01/28.99 |
| 7 | 43.79 | 27.84 | 1.57/1 | 71.63/28.37 |
| 8 | 42.24 | 29.16 | 1.45/1 | 71.40/28.60 |
| 9 | 34.86 | 27.85 | 1.25/1 | 62.71/37.29 |
| 10 | 35.27 | 35.55 | 0.99/1 | 70.82/29.18 |
| 11 | 34.48 | 28.48 | 1.21/1 | 62.96/37.04 |

The foregoing compositions are tested as in prior examples providing similar desirable results.

EXAMPLE 12

Prior examples are repeated using the following ratios of normal to non-normal alcohols.

```
98/2
91/9
75/25
50/50
25/75
9/91
2/98
```

The branched alcohol/secondary alcohol proportions are similar to those of Example 1. Iodine values about 0.1 to about 10.0.

The materials are tested, similar desirable results being obtained.

EXAMPLE 13

Prior examples are repeated using the following ratios of alcohols to non-alcohol components.

```
100/0
99/1
90/10
80/20
50/50
20/80
10/90
1/99
```

The branched alcohol/secondary alcohol proportions are similar to those of Example 1. Iodine values about 1.0 to about 10.0.

The materials are tested, similar desirable results being obtained.

EXAMPLE 14

Prior examples are repeated using the following ratios of branched primary alcohols to secondary alcohols:

```
99/1
90/10
80/20
50/50
20/80
10/90
1/99
```

The materials are tested as in Example 1, similar desirable results being obtained. Secondary alcohols include diols.

EXAMPLE 15

Example 1 is repeated with compositions in accordance with the following tabulation:

| Ratio Range (Approx.) Component A/Component B | (Approx. %) Component C |  |
|---|---|---|
| 10:1 to 1:10 | 0 to 99 | |
| 2:1 to 1:2 | 30 to 98 | |
| 10:1 to 1:10 | 85 to 98 | |
| 10:1 to 1:10 | 25 to 75 | |
| 10:1 to 1:10 | 30 to 40 | |
| 2:1 to 1:1 | 0 to 99 | |
| 2:1 to 1:1 | 0 to 99 | (mixture of straight chain and branched chain) |
| 10:1 to 1:10 | 0 to 99 | (all molecules having an even number of carbon atoms per molecule) |
| 10:1 to 1:10 | 0 to 99 | (straight chain carbon skeleton in 50–75 percent by weight of total, substantially all molecules present contain an even number of carbon atoms, and melting point of the mixture is from about 110 to about 125°F in most cases) |

The compositions are tested as in Example 1, similar desirable results being obtained.

EXAMPLE 16

Prior examples are repeated using the following ratios of secondary mono alcohol to diols, the diols being mixed vicinal diols up to about 1,4-types.

```
100/0
90/10
80/20
70/30
60/40
50/50
```

The materials are tested as in Example 1, similar results being obtained.

EXAMPLE 17

Example 1 is repeated with a composition similar to Example 1 but wherein the iodine value is less than 0.1 (substantially all molecules saturated) and wherein the diol content is less than 1 percent.

Similar results are obtained.

EXAMPLE 18

Example 1 is repeated wherein the paraffin* constituency is replaced by an equal weight percent of perchloro ethylene. Similar results are obtained; however, the composition is liquid at ordinary temperatures and is therefore applied and used as a liquid.

EXAMPLE 19

Example 18 is repeated with 1,1,1-trichloro ethane substituted for perchloro ethylene. Similar results are obtained.

EXAMPLE 20

Example 18 is repeated with the following substituted hydrocarbon diluents. Similar desirable results are obtained. Trichloro ethylene; 1,1,1-trichloroethane; trichlorofluoromethane; 1,2,3-trichloropropane; carbon tetrachloride; chloroform; vinylidene chloride; ethylene dichloride; ethylene dibromide; trichlorotrifluoroethane; and dichlorotetrafluoroethane.

We claim:

1. In a process for working a metal wherein the metal is subjected to lubrication with a lubricant, the improvement wherein the lubricant consists essentially of:
    Component A which is unsubstituted substantially saturated aliphatic monohydric normal alcohol containing from about 20 to about 34 carbon atoms per molecule,
    Component B which is unsubstituted aliphatic monohydric or dihydric non-normal alcohol containing from about 20 to about 34 carbon atoms per molecule and having less than about 5 percent unsaturated molecules,
    Component C which is hydrocarbon having from about 20 to about 34 carbon atoms per molecule,
    the amount of Component C being up to about 99 percent by weight and the amount of Component A and Component B being at least 1 percent by weight,
    the weight ratio of Component A to Component B ranging from about 10 to 1 to about 1 to 10.

2. A process in accordance with claim 1 wherein the amount of Component C is from about 30 to about 98 percent by weight and wherein the weight ratio of Component A to Component B is from about 2:1 to about 1:2.

3. A process in accordance with claim 1 wherein the amount of Component C is from about 85 to about 98 percent by weight.

4. A process in accordance with claim 1 wherein the amount of Component C is from about 25 percent to about 75 percent by weight.

5. A process in accordance with claim 1 wherein the amount of Component C is from about 30 percent to about 40 percent by weight.

6. A process in accordance with claim 1 wherein the weight ratio of Component A to Component B is from about 2:1 to about 1:1.

7. A process in accordance with claim 1 wherein substantially all Component A, B and C molecules present contain an even number of carbon atoms per molecule.

8. A process in accordance with claim 1 wherein the overall percentage of molecules of straight chain carbon skeletal configuration is from about 50 to about 75 percent by weight, wherein substantially all molecules present contain an even number of carbon atoms and wherein the melting point is from about 110° to about 125°F.

9. A process in accordance with claim 1 wherein the metal is a non-ferrous metal.

10. In a process for machining a non-ferrous metal, the improvement wherein the metal is lubricated with a lubricant consisting essentially of:
    Component A which is unsubstituted substantially saturated aliphatic monohydric normal alcohol containing from about 20 to about 34 carbon atoms per molecule,
    Component B which is unsubstituted aliphatic monohydric or dihydric non-normal alcohol containing from about 20 to about 34 carbon atoms per molecule and having less than about 5 percent unsaturated molecules,
    Component C which is hydrocarbon having from about 20 to about 34 carbon atoms per molecule,
    the amount of Component C being up to about 99 percent by weight and the amount of Component A and Component B being at least 1 percent by weight,
    the weight ratio of Component A to Component B ranging from about 10 to 1 to about 1 to 10.

11. In a process for working a metal wherein the metal is subjected to lubrication with a lubricant, the improvement wherein the lubricant consists essentially of:
    Component A which is unsubstituted substantially saturated aliphatic monohydric normal alcohol containing from about 20 to about 34 carbon atoms per molecule,
    Component B which is a mixture of unsubstituted aliphatic alcohols having from about 20 to about 34 carbon atoms per molecule and having less than about 5 percent unsaturated molecules therein, said Component B containing,
    a. branched primary monohydric alcohols,
    b. secondary monohydric alcohols, and
    c. dihydric alcohols,
    the weight ratio of (c) to (b) being up to about 1:1 and the weight ratio of (b) to (a) being up to about 2:1, Component C which is paraffinic or olefinic hydrocarbon having from about 20 to about 34 carbon atoms per molecule, the amount of Component C being up to about 99 percent by weight and the amount of Component A and Component B being at least 1 percent by weight, the weight ratio of Component A to Component B ranging from about 10 to 1 to about 1 to 10.

12. In a process for working a metal wherein the metal is subjected to lubrication with a lubricant, the improvement wherein the lubricant consists essentially of:

Component A which is unsubstituted substantially saturated aliphatic monohydric normal alcohol containing from about 20 to about 34 carbon atoms per molecule, Component B which is a mixture of unsubstituted aliphatic alcohols having from about 20 to about 34 carbon atoms per molecule and having less than about 5 percent unsaturated molecules therein, said Component B containing, a. branched primary monohydric alcohols,
b. secondary monohydric alcohols, and
c. dihydric alcohols, the weight ratio of (c) to (b) being up to about 1:1 and the weight ratio of (b) to (a) being up to about 2:1, Component C which is a compatible halohydrocarbon diluent, the amount of Component C being up to about 99 percent by weight and the amount of Component A and Component B being at least 1 percent by weight, the weight ratio of Component A to Component B ranging from about 10 to 1 to about 1 to 10.

13. In a process for working aluminum wherein the aluminum is subjected to lubrication with a lubricant, the improvement wherein the lubricant consists essentially of:

Component A which is unsubstituted substantially saturated aliphatic monohydric normal alcohol containing from about 20 to about 34 carbon atoms per molecule, Component B which is unsubstituted aliphatic monohydric or dihydric non-normal alcohol containing from about 20 to about 34 carbon atoms per molecule and having less than about 5 percent unsaturated molecules, Component C which is hydrocarbon having from about 20 to about 34 carbon atoms per molecule, the amount of Component C being up to about 99 percent by weight and the amount of Component A and Component B being at least 1 percent by weight, the weight ratio of Component A to Component B ranging from about 10 to 1 to about 1 to 10.

14. A process in accordance with claim 13 wherein the amount of Component C is from about 30 to about 98 percent by weight and wherein ratio of Component A to Component B is from about 2:1 to about 1:2.

15. A process in accordance with claim 13 wherein the amount of Component C is from about 85 to about 98 percent by weight.

16. A process in accordance with claim 13 wherein the amount of Component C is from about 25 percent to about 75 percent by weight.

17. A process in accordance with claim 13 wherein the amount of Component C is from about 30 percent to about 40 percent by weight.

18. A process in accordance with claim 13 wherein the weight ratio of Component A to Component B is from about 2:1 to about 1:1.

19. A process in accordance with claim 13 wherein substantially all Component A, B and C molecules present contain an even number of carbon atoms per molecule.

20. A process in accordance with claim 13 wherein the overall percentage of molecules of straight chain carbon skeletal configuration is from about 50 to about 75 percent by weight, wherein substantially all molecules present contain an even number of carbon atoms and wherein the melting point is from about 110° to about 125°F.

21. In the sawing of metallic aluminum, the improvement wherein the sawing is effected in the presence of a lubricant consisting essentially of:

Component A which is unsubstituted substantially saturated aliphatic monohydric normal alcohol containing from about 20 to about 34 carbon atoms per molecule, Component B which is unsubstituted aliphatic monohydric or dihydric non-normal alcohol containing from about 20 to about 34 carbon atoms per molecule and having less than about 5 percent unsaturated molecules, Component C which is hydrocarbon having from about 20 to about 34 carbon atoms per molecule, the amount of Component C being up to about 99 percent by weight and the amount of Component A and Component B being at least 1 percent by weight, the weight ratio of Component A to Component B ranging from about 10 to 1 to about 1 to 10.

* * * * *